(12) United States Patent
Matsui et al.

(10) Patent No.: US 7,089,569 B2
(45) Date of Patent: Aug. 8, 2006

(54) DISK DRIVE HAVING MEANS FOR PRESSING DISK TRAY BY USING CHASSIS CASE AS A REACTION POINT

(75) Inventors: Nobuki Matsui, Tokyo (JP); Takashi Watanabe, Tokyo (JP)

(73) Assignee: Teac Corporation, Tokyo (JP)

( * ) Notice: Subject to any disclaimer, the term of this patent is extended or adjusted under 35 U.S.C. 154(b) by 103 days.

(21) Appl. No.: 10/697,952

(22) Filed: Oct. 30, 2003

(65) Prior Publication Data
US 2004/0128677 A1    Jul. 1, 2004

(30) Foreign Application Priority Data
Oct. 31, 2002   (JP)   ............................. 2002-318324

(51) Int. Cl.
*G11B 17/03*   (2006.01)

(52) U.S. Cl. ..................................... 720/611

(58) Field of Classification Search ................ 720/601, 720/611
See application file for complete search history.

(56) References Cited

U.S. PATENT DOCUMENTS
5,140,579 A  *  8/1992   Suzuki et al. ............... 720/611

FOREIGN PATENT DOCUMENTS
JP        2000-187916       7/2000

* cited by examiner

*Primary Examiner*—David Davis
(74) *Attorney, Agent, or Firm*—Weingarten, Schurgin, Gagnebin & Lebovici LLP

(57) ABSTRACT

To improve the vibration resistance of a disk tray of a disk drive for driving an optical disk, accurately keep the clearance between a turntable for rotating the optical disk and the back of a cover chassis, and exclude factors of a read error and a write error, and improve the reliability. A chassis case 10, a disk tray 1 movable between an loading position in the chassis case 10 and an unloading position outside of the chassis case 10 while supporting a discoid recording medium, pressing means set between the chassis case 10 and disk tray 1 to generate a pressing force for pressing the disk tray 1 in the "direction perpendicular to a recording medium" by using the chassis case 10 as a reaction point when loading the disk tray 1 are included in which the pressing means presses the disk tray 1 in the "direction perpendicular to a recording medium" when the disk tray 1 is located at the loading position.

7 Claims, 18 Drawing Sheets

DISK DRIVE HAVING MEANS FOR PRESSING DISK TRAY BY USING CHASSIS CASE AS A REACTION POINT

This application claims priority to a Japanese application No. 2002-318324 filed Oct. 31, 2002.

BACKGROUND OF THE INVENTION

1. Field of the Invention

The present invention relates to a disk drive for driving an optical disk such as a CD (Compact Disk) or DVD (Digital Versatile Disk) generally used as a recording medium, particularly to a disk drive whose structure, reliability, and operability are improved correspondingly with the adoption of a thin type disk drive.

2. Detailed Description of the Related Art

In general, a disk drive for driving an optical disk is integrally built in the body of a personal computer (hereafter referred to as PC) or the like to record or reproduce information in or from the optical disk (for example, refer to Patent Document 1). FIG. 18 shows the appearance of a notebook PC with the built-in disk drive mentioned above. Usually, in the disk drive, a disk tray 101 pops out by operating a switch or a command from the PC body and then, a user of the PC takes out the disk tray 101 and sets an optical disk D to the disk tray 101.

FIG. 19 shows the appearance of a disk drive frequently used particularly for a notebook PC. As shown in FIG. 19, a turntable 102 fixed to a driving shaft of a spindle motor set just below a disk tray 101 is set to the center of the disk tray 101. A clamping mechanism 102*a* integrated with the turntable 102 clamps a central hole of an optical disk D so as to transfer a torque. Moreover, a head unit 103 mainly constituted by an optical pickup moves in a slit 101*a* formed on the disk tray 101 in the radial direction so as to record or reproduce information in or from the optical disk D. The disk tray 101 is thus constituted so that it is housed in a chassis case 105 with the support of a guide rail 104.

FIG. 20 shows a setting structure of a bezel 106 to the front face of the disk tray 101. An earth plate 107 for discharging static electricity is fixed on the back face of the bezel 106 and an open end 107*a* of the earth plate 107 contacts with an opening 105*a* of the chassis case 105 when the disk tray 101 is loaded, so that a discharge channel is formed.

[Patent Document 1]
Japanese Patent Application No. 2002-171604

In recent notebook PCs, to minimize their thickness and weight is desired and is also regarded as an important problem in development of them. However, a disk drive to be built in a notebook PC has an optical disk driving unit, and thus the disk drive is the most difficult part to decrease thickness.

Though the standard thickness of the disk drive is approximately 12.7 mm at present, the thickness of approximately 9.5 mm is further requested. However, to achieve the requested thickness, individual parts become proportionally small and the clearance between movable parts becomes strict, so the design of the disk drive is very difficult. Moreover, in a recent disk drive for driving an optical disk having a very high recording density, it is necessary to further improve a structural accuracy while reducing the thickness of the disk drive, and any structural defect must be prevented to occur.

The present invention is made to solve the above-described problem and has an object to provide an improved technique for a disk drive, including an existing disk drive, whose structural accuracy, reliability and operability are improved even when the thickness of the disk drive is reduced.

SUMMARY OF THE INVENTION

To achieve the above object, the present invention comprises a chassis cases a disk tray which supports a disk-shaped recording medium and is movable between a loading position in the chassis case and an unloading position outside of the chassis case, and a pressing means set between the chassis case and the disk tray to generate a pressing force for pressing the disk tray in the direction perpendicular to the recording medium by using the chassis case as a reaction point when loading the disk tray, in which the pressing means presses the disk tray in the direction perpendicular to the recording medium.

According to the present invention, pressure is generated by a roller elastically supported so that a rolling surface is exposed from the surface of a disk tray and the slider of a side arm.

Furthermore, according to the present invention, the disk drive is characterized in that the pressing means is provided with a roller supported by either of a chassis case or a disk tray and whose rolling surface can contact with the other.

According to the present invention, the disk drive is characterized in that the pressing means does not generate a pressing force against a disk tray when the disk tray is located at an unloading position but it generates the pressing force against the disk tray when it is located at an unloading position.

According to the present invention, the disk drive is characterized in that the disk tray has a disk support means which rotatably supports a recording medium and the pressing means generates a pressure against the disk tray before the disk support means enters a chassis case while the disk tray moves from an unloading position to a loading position.

According to the present invention, the disk drive is characterized in that the pressing means has a contact face tilting in both directions such as the direction perpendicular to a recording medium and a radial direction of the recording medium and a contact portion contacting with the contact face and generates a pressing force in the direction substantially perpendicular to the contact face against a disk tray.

According to the present invention, the disk drive is characterized in that the disk tray has a main potion having a dimensional shape from which a recording medium protrudes and a side arm portion extending along the recording medium protruded from the main body portion, the chassis case has a recording medium protruding from the main body portion of the disk tray and a housing convex portion for housing the disk tray and side arm portion, and the pressing means is set between the side arm portion of the disk tray and the housing convex portion of the chassis case.

DESCRIPTION OF SYMBOLS

A Driving mechanism,
B Ejecting/locking mechanism,
C Slider mechanism,
1 Disk tray,
1a Slit,
1b Cutout,
1c Side arm,
1d Insertion hole,
1e Convex rail,
1f Window hole,
1g Bearing block,
1h Angle,
1i Positioning boss,
1j Securing protrusion,
2 Turntable,
3 Spindle motor,
4 Head unit,
5 Guide rail,
5a Fine ruggedness,
6 Sealing material,
7 Printed circuit board,
8 Bezel,
8b Through-hole,
9 Earth plate,
10 Chassis case,
11 Base chassis,
12 Cover chassis,
13 Holding rail,
14 Short-circuit member,
15 Bottom cover,
16 Thread motor,
17 Gear unit,
18 Guide shift,
19 Teeth member,
19b Teeth,
20 Screw shaft,
20a Guide groove,
21 Support member,
23 Gear frame,
24 Bearing groove,
25 Covering plate,
27 Self-holding solenoid,
28 Canceling lever,
29 Locking lever,
29a Resin main body,
29b Steel sheet mold material,
29d Slope,
29e Angle portion,
30 Returning lever,
32 Returning pin,
33 Locking pin,
35 Pop-out mechanism,
38 Roller,
39 Roller,
40 Support plate,
41 Slider,
41b Slope,
42 Torsion coil spring

DETAILED DESCRIPTION OF THE PREFERRED EMBODIMENT

Embodiments of the present invention are described below in detail by referring to the accompanying drawings. Though the present invention is preferably applied to a disk drive to be made thinner, it can be also applied to an existing disk drive. Thus, objects to which the present invention is applied are not restricted. Moreover, to make a disk drive to which the present invention is applied easily understood, the disk drive is described below including the outline of the general configuration.

Figure 1:
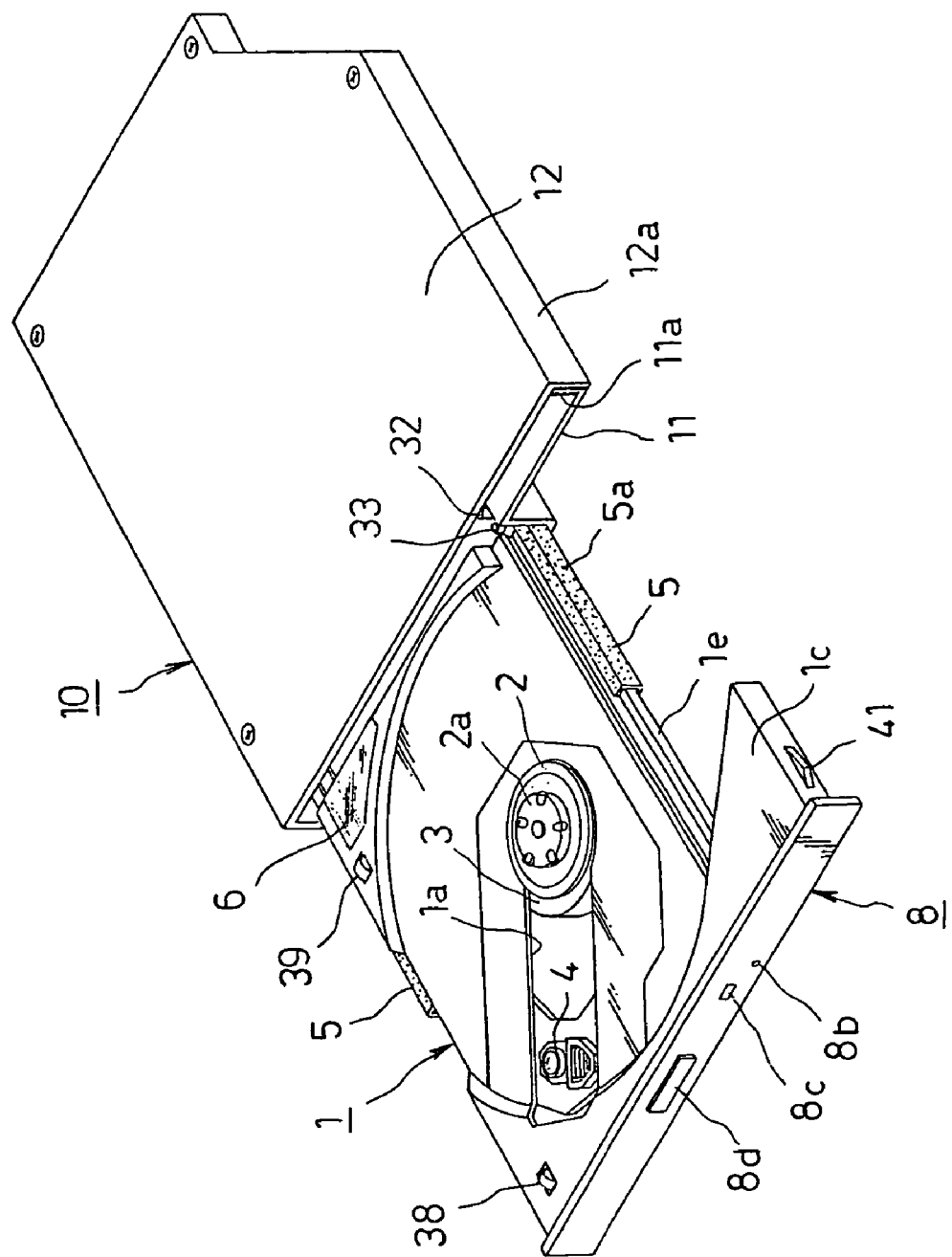
FIG. 1 is a perspective view of a disk drive when a disk tray is unloaded.
Figure 2:
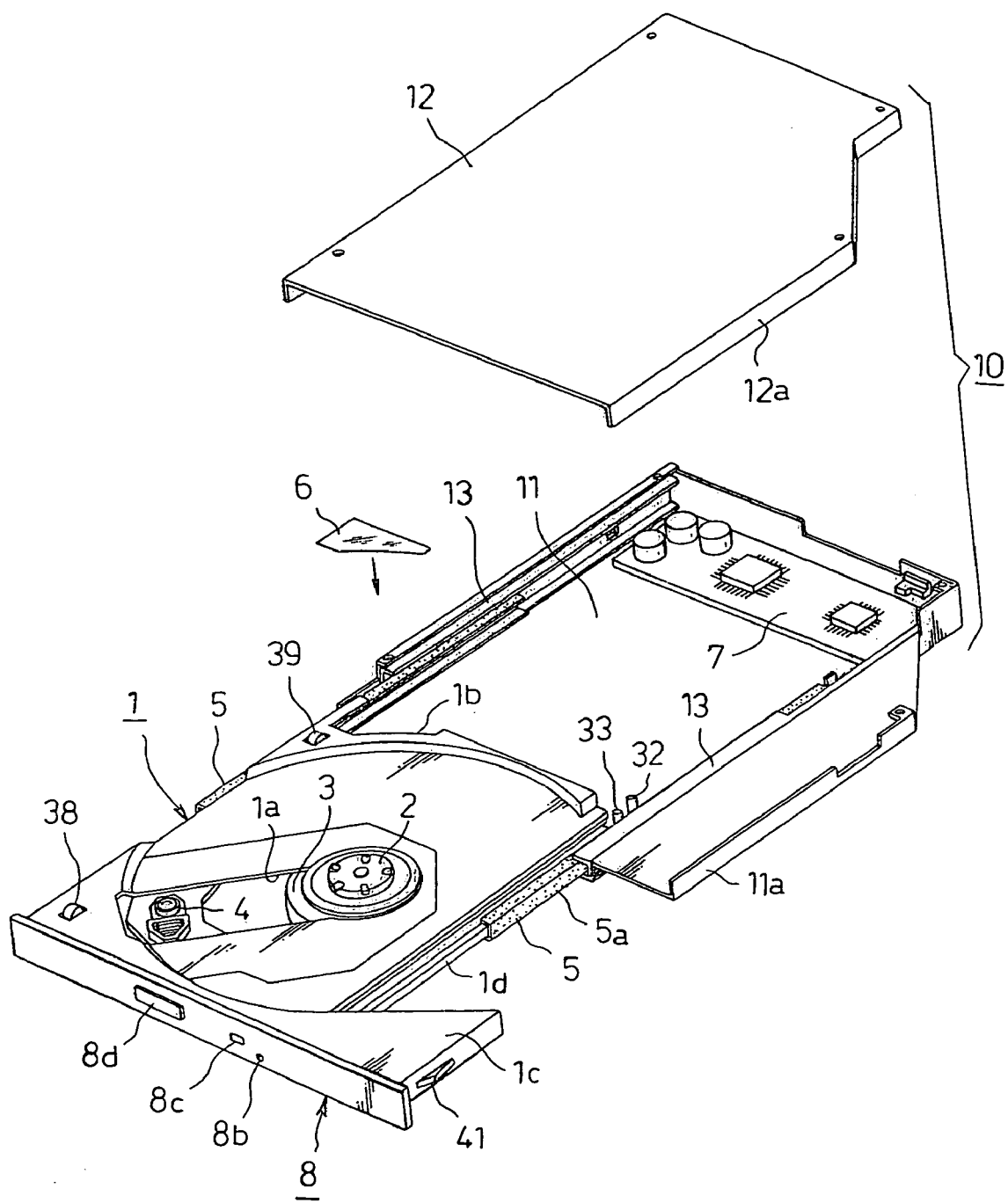
FIG. 2 is a perspective view of a disk drive when a cover chassis is removed.
Figure 4:
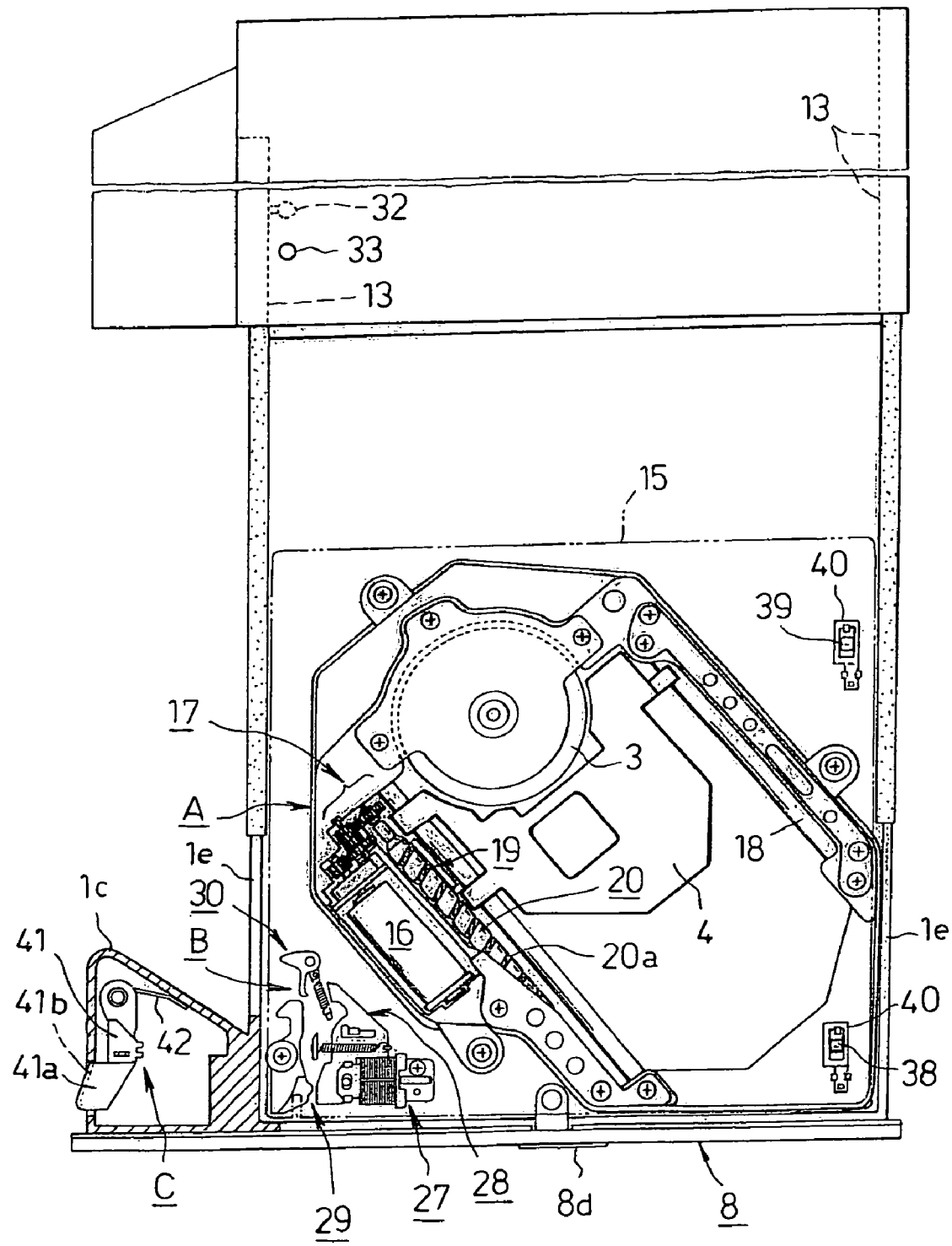
FIG. 4 is a top view showing an internal configuration of a disk tray.

FIGS. 1 and 2 are perspective views showing the appearance of a disk drive to which the present invention is applied. In the figures, symbol 1 denotes a disk tray integrally formed by a synthetic resin, a turntable 2 located at its center is fixed to a driving shaft of a spindle motor 3 which is built in the disk tray 1 and is shown in FIG. 4, and a clamping mechanism 2a integrally constituted with the turntable 2 clamps an optical disk and rotates the disk. Moreover, a head unit 4 mainly constituted by an optical pickup moves in the radial direction inside of a slit 1a formed on the disk tray 1 to record or reproduce information in or from the optical disk. Thus, the disk tray 1 is constituted to be housed in a chassis case 10 with support by a guide rail 5.

A cutout 1b for preventing a printed circuit board 7 set on the chassis case 10 from contacting to electronic parts is formed at the end of the inner part of the disk tray 1 and the cutout 1b is sealed by a sealing material 6 when it is necessary. Such configuration is an effective means for constituting a thin disk tray, and the wall thickness of the disk tray 1 can be decreased.

Figure 3:
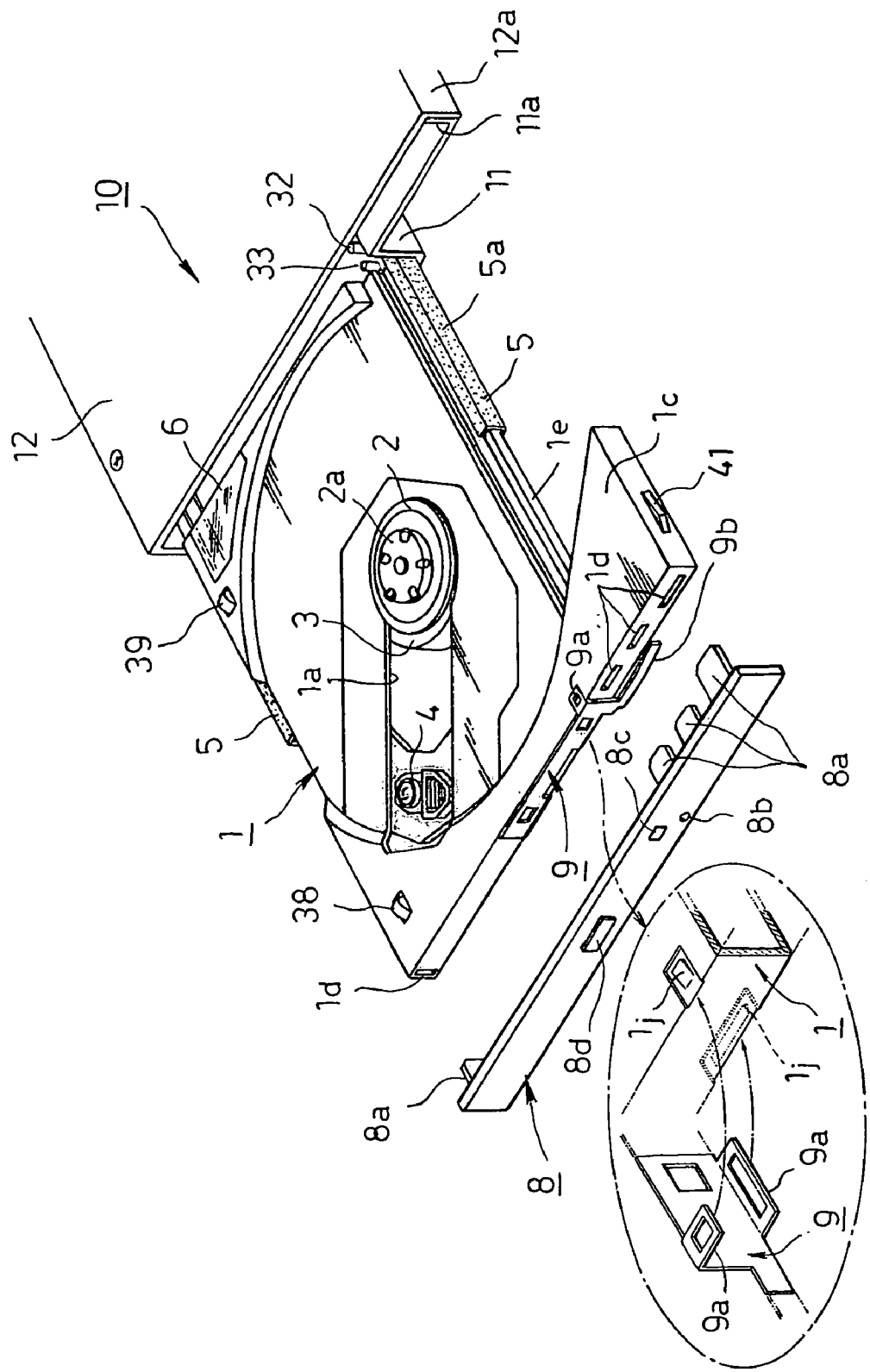
FIG. 3 is a perspective view showing a configuration of a disk tray.

Then, the disk tray 1 is formed integrally with a side arm 1c for housing a slider mechanism C, which is to be described later, on one side of the front end of the disk tray 1; moreover, a bezel 8 is attached to the front end of the disk tray 1 so as to insert its tongue 8a into an insertion hole 1d in the disk tray 1 as shown in FIG. 3. Symbol 8b denotes a through-hole into which an operation pin is inserted in order to forcibly cancel (emergency-eject) a locking state of an ejecting/locking mechanism in the disk tray 1 at the time of emergency. Symbol 8c denotes an indicator display window, and symbol 8d denotes an operation button for unloading the disk tray 1.

Moreover, an earth plate 9 is set to a securing protrusion 1j of the disk tray 1 by a nail piece 9a of the earth plate 9 at the front end of the disk tray 1, and an open end 9b of the disk tray 1 contacts with an opening of the chassis case 10 when the disk tray 1 is loaded, so a discharge channel is formed. The earth plate 9 has a function for discharging static electricity to the discharge channel and prevent electrical parts from damaging due to the static electricity from human body when a finger tip contacts with an operation button because the disk tray 1 is forcibly canceled as described above or for unloading. Conventionally, the configuration in which the earth plate 9 is fixed to the bezel side is generally adopted.

By the way, the bezel is used to decorate the front face of the disk drive. In general, a bezel individually designed to be matched each PC is used.

According to such situation, in many cases, a supplier delivers a finished disk drive without mounting a bezel; a PC manufacturer receiving the disk drive then manufactures a bezel and fixes it to the front end of the disk tray. However, because an earth plate is conventionally integrated with a bezel through thermal caulking or the like, the cost for the thermal caulking is an obstacle to lower the production cost of the disk tray.

To solve the above-described inefficient situation, the earth plate 9 is previously set to the front end of the disk tray 1, so the PC manufacturer is only need to manufacture a bezel which requires no integration with an earth plate. As a result, the manufacturer can lower the caulking cost.

Then, as shown in FIG. 2, a base chassis 11 and a cover chassis 12 constitutes the chassis case 10 molded by a light metal such as aluminum or magnesium. An opening of the base chassis 11 is covered with the cover chassis 12 and screwed. Subsequently, a holding rail 13 made of a synthetic resin is fixed to the both ends of the base chassis 11 and a metallic guide rail 5 is supported in the holding rail 13 so as to be able to freely move forward and backward. Moreover, the guide rail 5 supports a convex rail 1d formed at the both ends of the disk tray 1 so that the convex rail 1d can freely move forward and backward. Thus, when the disk tray 1 is completely housed in the chassis case 10, magnetism and the static electricity of the disk tray 1 are shielded, the open end 9b of the earth plate 9 contacts with the opening of the chassis case 10, and the discharge channel is formed. According to the configuration of the embodiment of the present invention, because the earth plate 9 is fixed to the front end of the disk tray 1, it is possible to prevent influence of the static electricity on electrical parts in the disk tray 1 even when the bezel 8 is not set.

Figure 5:
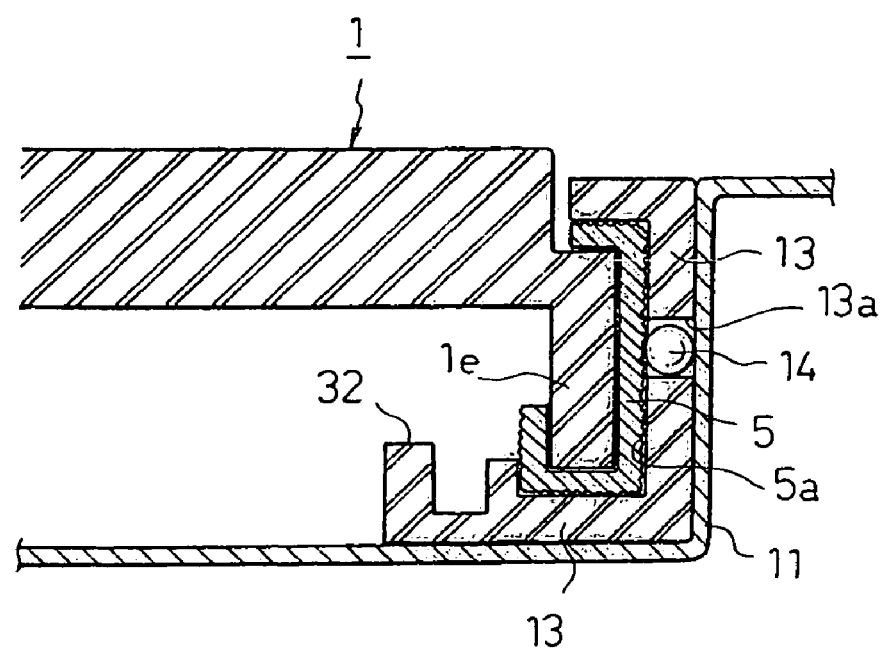
FIG. 5 is a sectional view of a disk tray support structure.

FIG. 5 is an enlarged sectional view showing an assembling state of the holding rail 13, the guide rail 5 and the convex rail 1e of the disk tray 1, which serve as a moving mechanism of the disk tray 1. As shown in FIG. 5, satin-finished ruggedness 5a is formed on the outer surface of the guide rail 5 of the present invention. This is a treatment for reducing slide contact resistance between the holding rail 13 and the guide rail 5, and forward and backward movements of the disk tray 1 can be operated with smoother feeling owing to the treatment.

Though the above treatment is not applied to a conventional disk drive, the clearance between the holding rail 13 and the guide rail 5 becomes very small because a disk drive is decreased in thickness and increased in informational density. The small clearance is important to avoid influence of vibrations or the like on the recording or reproducing of information, and the disk drive is designed with the minimized clearance. When the holding rail 13 and guide rail 5 are constituted under such condition, the contact ratio of a slide contact wall surface rises and a resistance is caused in operations of the disk tray 1. As a result, the smooth operation of the disk tray 1 becomes impossible to realize. Therefore, as described above, by forming the fine ruggedness 5a on the guide rail 5, a slide contact resistance is reduced to maintain the smooth operation of the disk tray 1.

The fine ruggedness may be formed on both inside and outside of the guide rail 5 or on the convex rail 1d of the holding rail 13 and the disk tray 1. In other words, it is enough to form a slide contact face on which the fine ruggedness is formed and another slide contact face contacting with the one with the fine ruggedness into smooth planes. In FIG. 5, symbol 14 denotes a short-circuit member and because the holding rail 13 is an insulator, so the member is used to electrically connect the guide rail 5 with the base chassis 11. In the case of the embodiment shown in FIG. 5, though a steel ball is installed into a window hole 13a of the holding rail, a leaf spring, a coil spring, or conductive fiber can be used instead of the steel ball.

Then, the outline of a configuration of the inside of the disk tray 1 in the disk drive of the present invention is described below by referring to FIG. 4. FIG. 4 shows a state in which a bottom cover 15 is removed. A driving mechanism A, which is mainly constituted by the spindle motor 3 for rotating and driving an optical disk in the center of the disk tray 1, the head unit 4, and a thread motor 16 and a gear unit 17 for reciprocating the head unit 4 in the radial direction of the optical disk, is set. Moreover, an ejecting/locking mechanism B is set at the front end corner of the disk tray 1 and a slider mechanism C is set in a side arm 1c.

Figure 6:
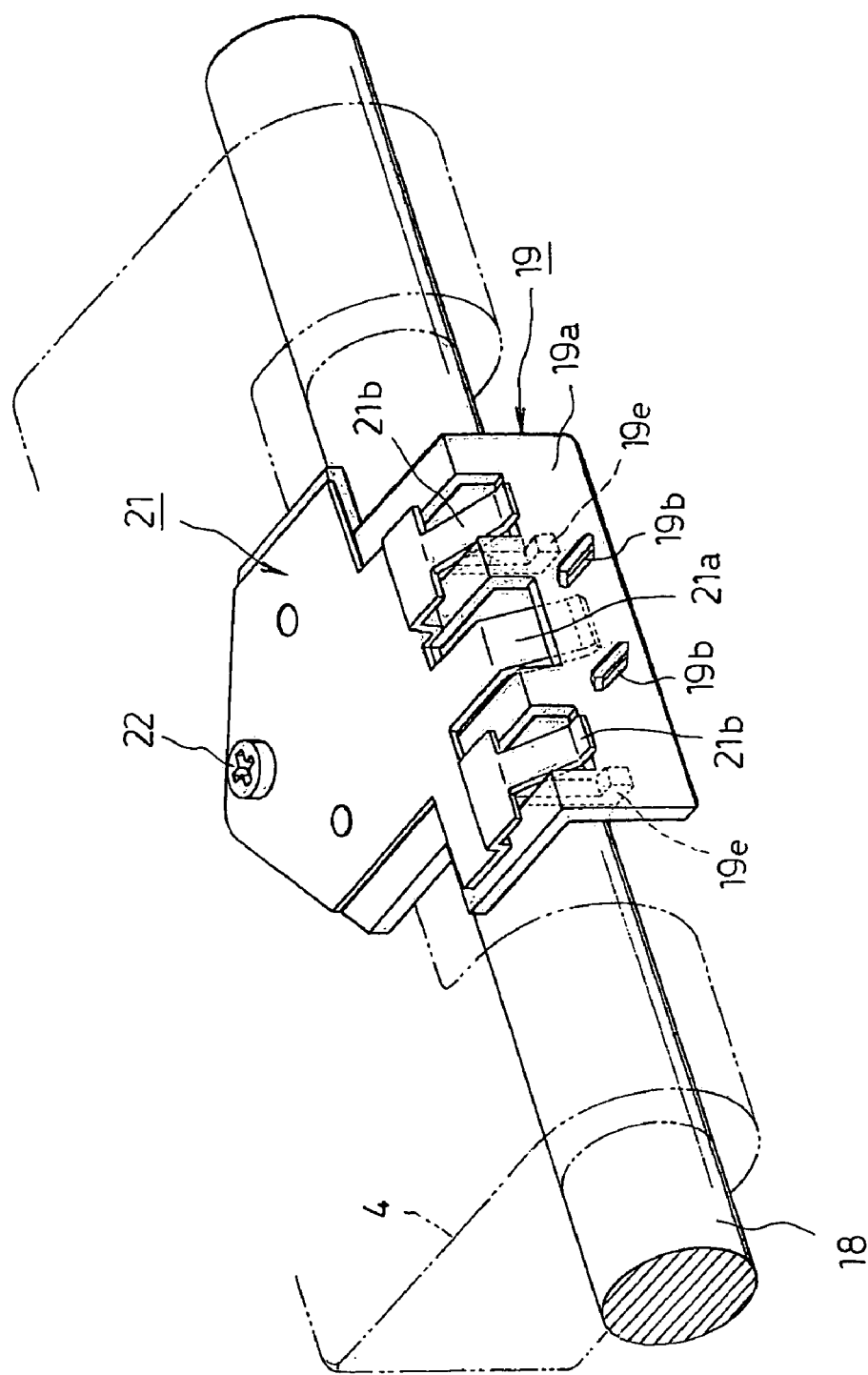
FIG. 6 is a perspective view of a teeth portion of a transfer mechanism of a head unit.

The both ends of the head unit 4 are loosely set to a guide shaft 18, teeth 19b of a teeth member 19 fixed to the head unit 4 are moved with the guide by a guide groove 20a of a screw shaft 20 so as to be reciprocated. FIG. 6 shows an enlarged view of an essential part of the above-described configuration, in which main bodies of the teeth member 19 and a support member 21 are fixed with a screw 22 to the head unit 4 loosely set to the guide shaft 18.

Figure 7:
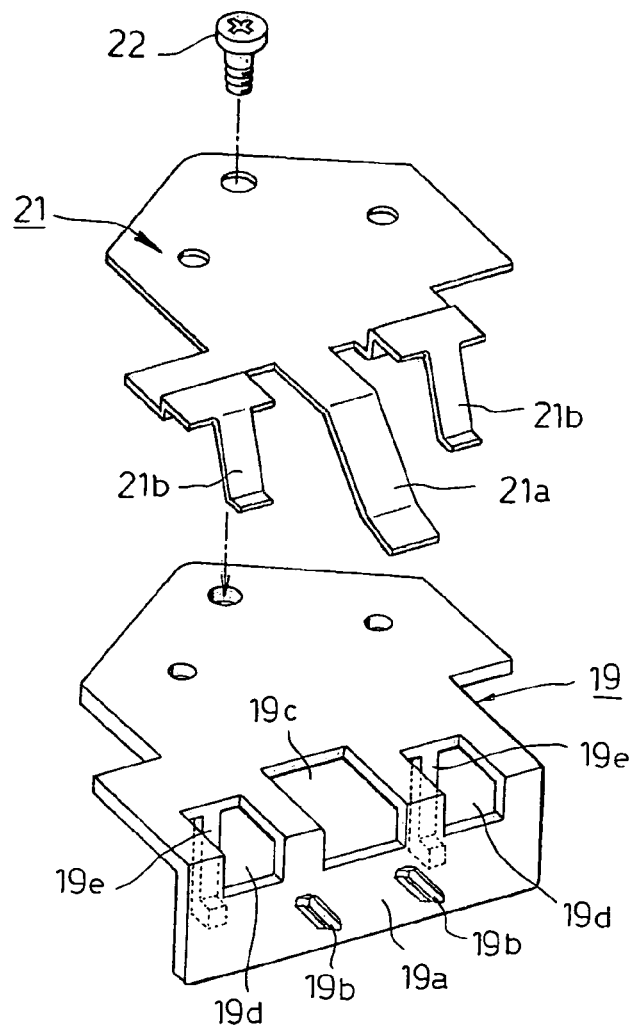
FIG. 7 is a perspective view of a teeth member and a support member of a head unit.
Figure 8:
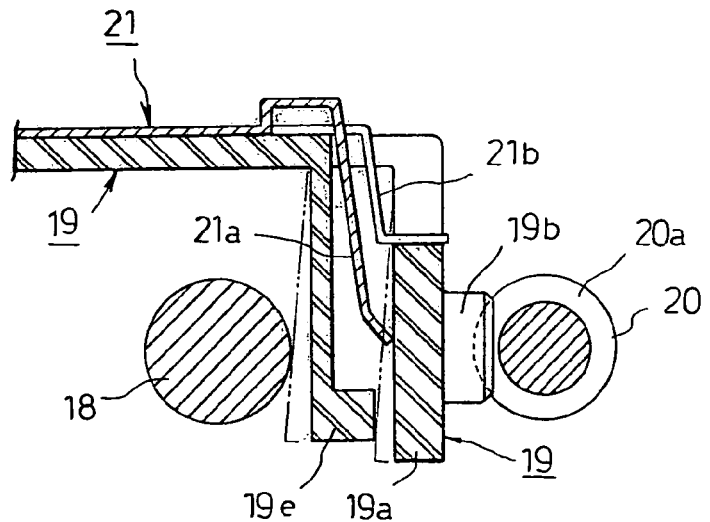
FIG. 8 is a sectional view of an assembled state of a teeth portion of a head unit.

As shown in FIG. 7, on the teeth member 19, the teeth 19b engaging with the guide groove 20a of a screw shaft 20 is formed on a sagging piece 19a of the end of the main body, and a window hole 19c is formed at the center. Moreover, window holes 19d are formed at the right and left side of the window hole 19c, and a pier stud 19e is integrally formed at the inner part of the window hole 19d in a sagging state. Moreover, a support piece 21b for preventing the sagging piece 19a of the teeth member 19 from rising and a pressing piece 21a for supporting the sagging piece 19a while energizing the piece 19a from its back are formed on the end of the main body on the support member 21.

Thus, by integrally fixing the teeth member 19 and support member 21 to the head unit 4, the sagging piece 19a of the teeth member 19 is energized forward by the pressing piece 21a while the piece 19a is pressed by the support piece 21b of the support member 21. Thereby, the teeth 19b of the sagging piece 19a are securely engaged with the guide groove 20a of the screw shaft 20, and it is possible to prevent the sagging piece 19a from rising. Moreover, when a force brought by the screw shaft 20 for depressing the sagging piece 19a works and the sagging piece 19a is displaced as shown by a virtual line in FIG. 7, the pier stud 19e is also depressed by the sagging piece 19a and contacts with the guide shaft 18, and the displacement of the sagging piece 19*a* is restricted at this position.

Thus, by combining and fixing the teeth member 19 with the support member 21, it is possible to completely prevent the teeth 19*b* from being removed from the guide groove 20*a* of the screw shaft 20 and correspond to the increase of the access speed of the head unit 4 to the optical disk. That is, as the improvement of the recording density of the optical disk, the frequency of reciprocation of the head unit 4 increases. Moreover, because the access speed is also increased, the rotational speed of the screw shaft 20 also increases.

Under the above-described situation, a sudden driving force from the guide groove 20*a* of the screw shaft 20 is added to the teeth 19*b* of the sagging piece 19*a* and in that instant, an upward or downward component force is generated to raise or depress the sagging piece 19*a*, the engagement state between the teeth 19*b* and the guide groove 20*a* becomes shallow. Thus, the danger of removal of the teeth 19*b* from the guide groove 20 increases. Moreover, such phenomenon has often appeared at the trailing end of the guide groove 20*a* of the screw shaft 20 in particular and the probability of the teeth 19*b* to be removed from the guide groove 20*a* has been high. However, by using the above configuration, it is possible to completely prevent the removal of the teeth 19*b*.

Then, a configuration of the gear unit 17 for rotating and driving the screw shaft 20 is described below. Conventionally, a gear unit for such portion is constituted by manually inserting a gear shaft of each gear into a bearing hole formed on a gear frame. When performing the manual operation, however, a tooth row usually formed by a synthetic resin was frequently damaged and when a damaged gear is in a gear unit, a problem of increased so-called seek noises occurred.

Figure 9:
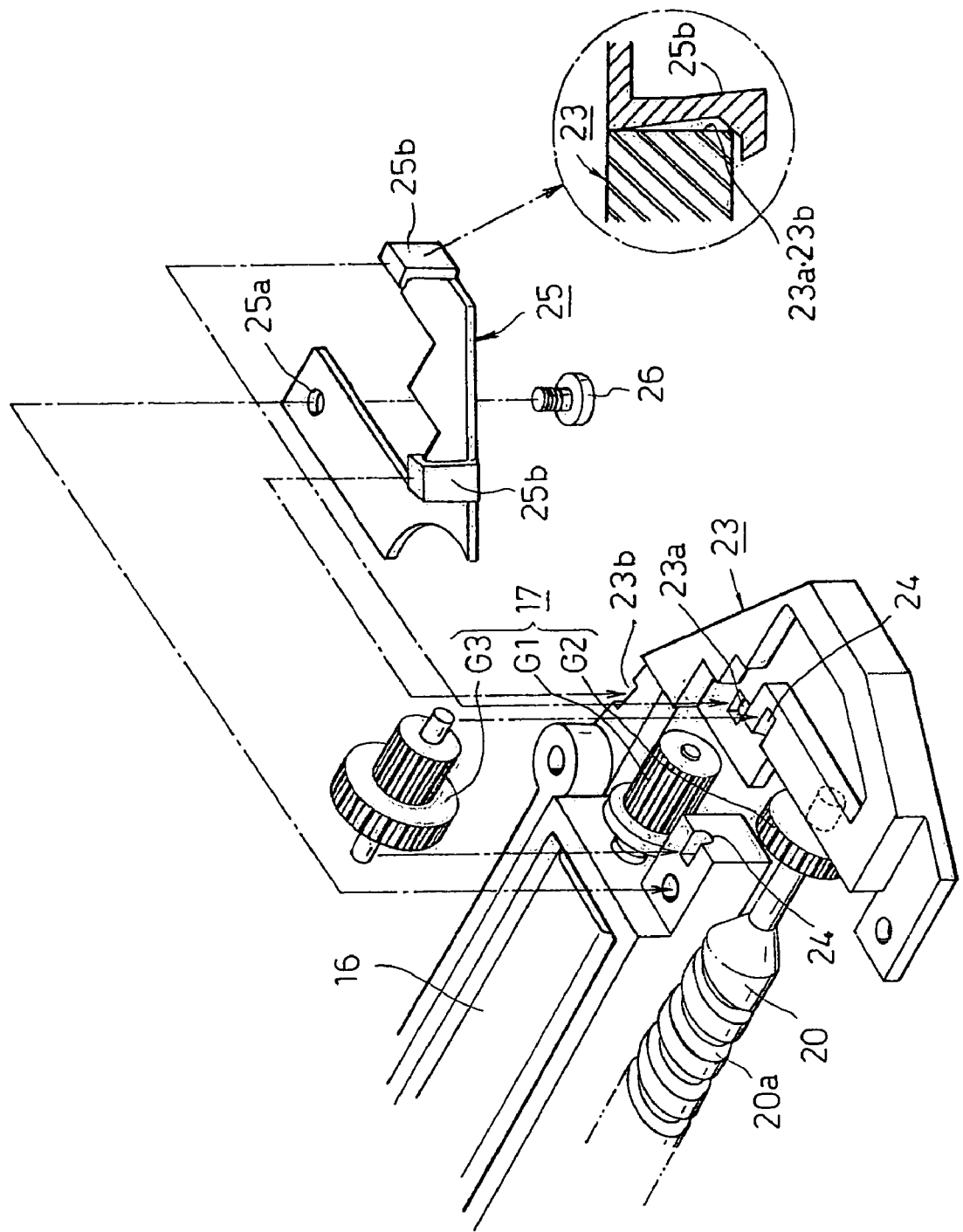
FIG. 9 is a perspective view for explaining an assembled state of a gear unit of a driving mechanism.

Therefore, the disk drive of the present invention uses the configuration shown in FIG. 9. In the configuration shown in FIG. 9, the composition of three simple gears G1, G2, and G3 constitutes the gear unit 17, and the gear G1 is fixed to an output shaft of the thread motor 16. On the other hand, the gear G2 is fixed to the screw shaft 20 to which the torque of the thread motor 16 will be transferred, and the shaft of the gear G2 is inserted into a bearing hole formed on a gear frame. Under such constitution, it is possible to smoothly install the gear G3 by inserting a gear shaft of the gear G3 into a bearing groove 24 formed on a gear frame 23.

Since the gear G3 is conventionally installed by inserting the gear shaft into the bearing hole, it is impossible to keep the gear horizontally at the time of its installation and thus, the tooth row is damaged. By using the above configuration, however, it is possible to install the gear G3 while keeping its horizontality and moreover, an excessively large load is not applied to tooth rows of the gears G1, G2, and G3 because the gears G1 and G2 rotate in accordance with installation of the gear G3. Consequently, it is possible to avoid the danger of damage of the gear unit 17 when it is assembled.

When using the configuration of the above-described gear unit 17, the gear shaft of the gear G3 is loosely inserted into the bearing groove 24. Therefore, a covering plate 25 is mounted so as to prevent the gear shaft from being removed from the bearing groove 24. A screw through-hole 25*a* is formed at one end of the covering plate 25 and securing pawls 25*b* are formed at two places of the other end as shown by an inverted state in FIG. 9. When fixing one end of the covering plate 25 to the gear frame 23 by a screw 26, one securing pawl 25*b* at the other end engages with a window hole 23*a* formed on the gear frame 23, and the other securing pawl 25*b* engages with a securing step 23*b*. Moreover, when the above securing pawls 25*b* engage with the window hole 23*a* and the securing step 23*b*, slopes formed at corners of under-cut portions of the securing pawls 25*b* contact with the top edge of the engagement position of the gear frame 23 as shown by a partially enlarged view in FIG. 9. Thus, it is possible to securely fix the covering plate 25 without free movement. Therefore, even if vibrations of the thread motor 16 and the gear unit 17 are propagated, the covering plate 25 is not vibrated and does not generate any noises.

Then, the constitution of the ejecting/locking mechanism B and its operation mode used for the disk drive of the present invention are described below. The ejecting/locking mechanism B fixes a state in which the disk tray 1 is loaded in the chassis case 10 or cancels the fixed state in order to be able to unload the disk tray 1, which is constituted by combining a self-holding solenoid 27, a canceling lever 28, a locking lever 29, and a returning lever 30 as shown in FIG. 10.

The self-holding solenoid 27 is fixed by inserting front ends of a pair of yokes 27*a* and 27*b* into energizing coils 27*c* and 27*d* from their rear ends up to almost middle portions. Moreover, a permanent magnet 27*e* is mounted to ends of the yokes 27*a* and 27*b* and thereby, a horseshoe-shaped magnetic circuit is formed. Moreover, a movable piece 27*f* serving as a magnetic material is inserted into front ends of the energizing coils 27*c* and 27*d* so as to be movable forward and backward.

In a steady state, the movable piece 27*f* is held in attracted state because of the magnetic force of the magnetic circuit formed by the permanent magnet 27*e*. Moreover, by applying a direct current so that the current can generate another magnetic field opposite to the magnetic field generated by the permanent magnet from terminals of the energizing coils 27*c* and 27*d*, the magnetic field generated by the permanent magnet 27*e* is canceled and the constraint of the movable piece 27*f* is canceled. Since the movable piece 27*f* is connected to a pin 28*a* fixed to the canceling lever 28, the canceling lever 28 is also horizontally reciprocated synchronously with forward or backward movement of the movable piece 27*f*. The self-holding solenoid 27 is fixed to the disk tray 1 by a screw.

Figure 10:
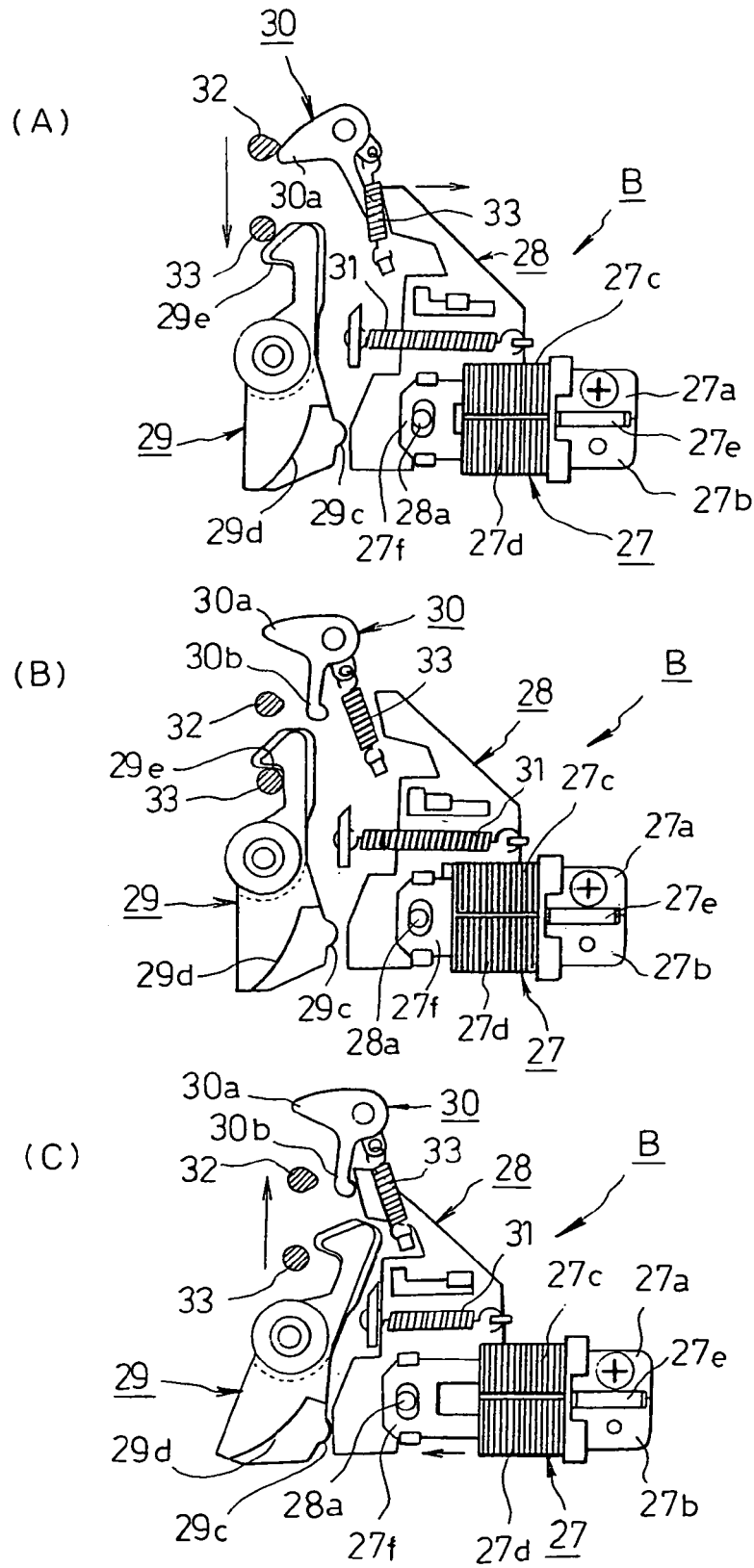
FIG. 10 is an illustration showing a configuration and an operation mode of an ejecting/locking mechanism.

Then, the canceling lever 28 is normally hooked and fixed by a tensile coil spring 31 so as to be energized leftward on FIG. 10. However, the spring force must be weaker than the constraint force of the magnetic force by the permanent magnet 27*e* of the self-holding solenoid 27.

Symbol 29 denotes a locking lever always energized by a slight spring force in counterclockwise direction on FIG. 10, which has a function of engaging with a locking pin 32 fixed in the chassis case 10 and keeping the loading state of the disk tray 1. Usually, as the locking lever having the above function, the one integrally molded with a synthetic resin is often adopted. However, the locking lever must be also decreased in wall thickness as the whole disk drive is decreased in thickness. The locking lever must have a sufficient durability because it is frequently operated although the locking lever integrally molded with a synthetic resin has a problem that the rigidity lowers.

Figure 11:
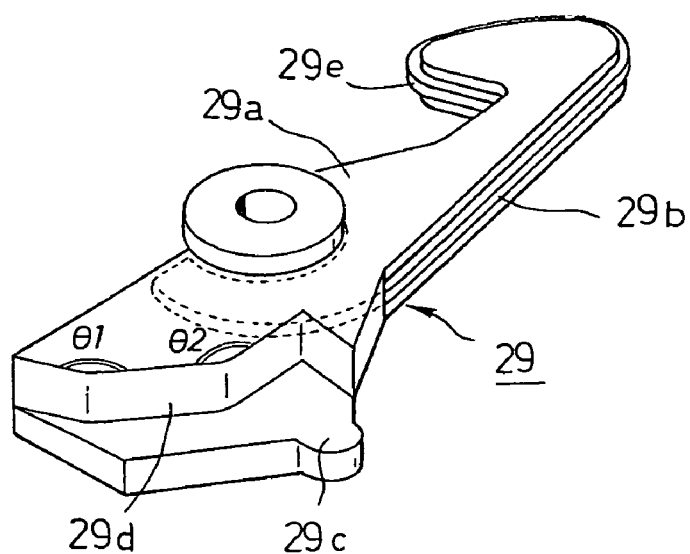
FIG. 11 is a perspective view of a locking lever of an ejecting/locking mechanism.

Hence, the present invention is thus constituted through the insert molding in which a resin main body 29*a* includes a steel sheet mold material 29*b* as shown in FIG. 11. As understood by the figure, the steel sheet mold material 29*b* is inserted into the front end and a portion requiring the highest rigidity is reinforced. Then, ends of the steel sheet mold material 29b are exposed from the synthetic resin portion, so that the slide contact resistance with the locking pin 32 decreases. On the other hand, an activating end 29c and a slope 29d (plane to be driven) for the forcible cancel are formed at the rear end of the locking lever 29.

The forcible cancel is used to correspond to occurrence of a trouble in which the disk tray 1 cannot be unloaded due to system malfunction while a locking pin 32 engages with an angle portion 29e of the locking lever 29. When such trouble occurs, as shown in FIG. 11, by inserting a proper operation pin P from the through-hole 8b of the bezel 8 and pushing the pin P while sliding the front end of the pin P along the slope 29d of the locking lever 29, it is possible to rotate the locking lever 29 clockwise, cancel the engagement with the locking pin 32, and take out the disk tray 1.

Figure 12:
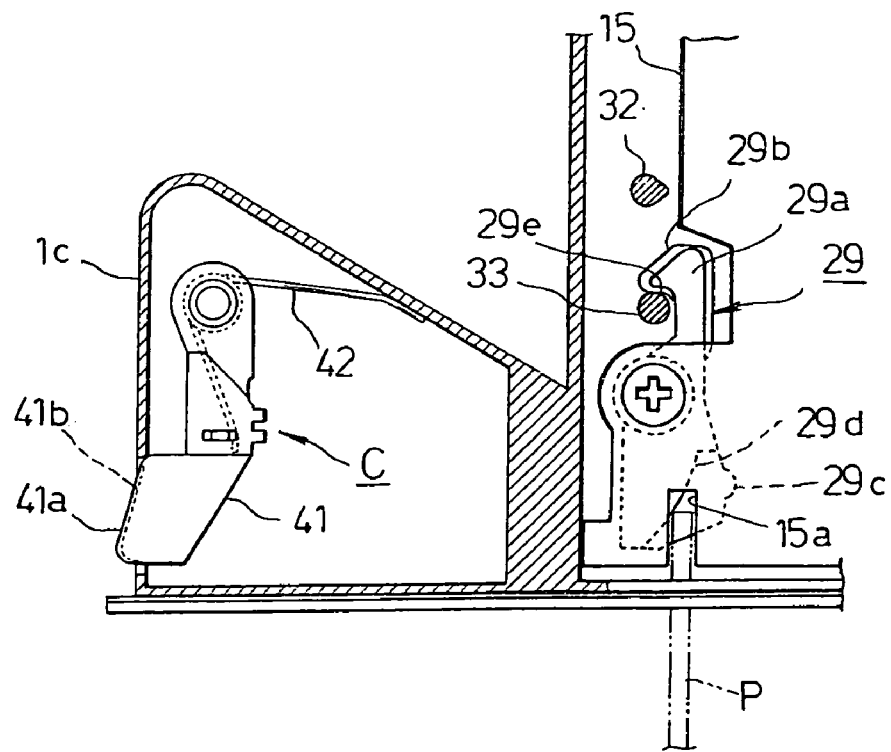
FIG. 12 is an illustration showing an ejecting/locking mechanism and a side arm portion.

Since the slope 29d of the locking lever 29 is made of a synthetic resin, it is possible to optionally form a tilted curved surface or a slope provided with stepwise angles θ1 and θ2 as shown in FIG. 11 and optionally form a slope in a state in which an operation feeling by the operation pin P is the best. Moreover, as shown in FIG. 12, because a cutout 15a is formed on the bottom cover 15 at a position corresponding to the slope 29d of the locking lever 29, the operation pin P can lower and the bottom cover 15 can be decreased in thickness up to the wall thickness. Moreover, because the cutout 15a serves as a guide groove of the operation pin P, it is possible to control free movement of the front end of the operation pin P at the time of forcible cancel and improve the operability.

The returning lever 30 is activated when an action end 30a of the lever 30 is pressed by a returning pin 32 (sic), so that the self-holding solenoid 27 is set to a steady state by operating the canceling lever 28 by an action end 30b. The returning lever 30 can be returned to an original position (refer to FIG. 10(B)) by a tensile coil spring 34.

Conventionally, a general configuration of the returning pin 32 is obtained by forming a metallic raw material into a cylinder, and then caulking and fixing ends of the cylinder to a base chassis. However, because the material is a metal and a sectional form of the pin 32 is cylindrical, the slide contact resistance with the returning lever 30 is large and so-called click shock occurs when loading the disk tray 1 with a finger and the operation feeling is attenuated.

Figure 13:
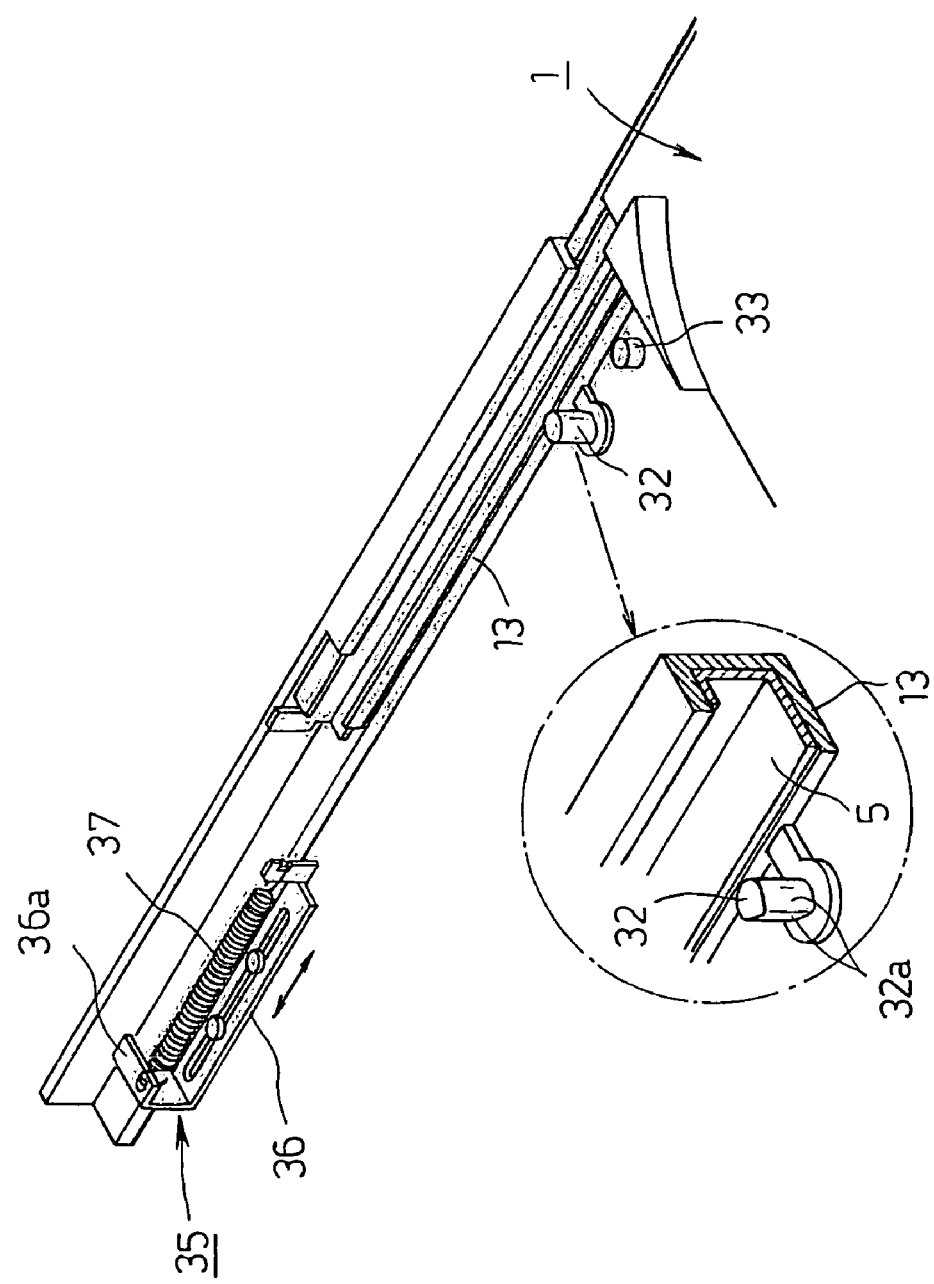
FIG. 13 is a perspective view for explaining a configuration of a locking pin.

Thus, in the present invention, the returning pin 32 is to be integrally formed by a synthetic resin which decreases a slide contact resistance, and it is extended from the holding rail 13 as shown in FIG. 13. Thereby, it is possible to form the returning pin 32 so as to have an optional sectional form. For example, it is possible to form a taper 32a as shown in the embodiment and reduce the slide contact resistance to reduce the click shock. Moreover, because it is possible to steadily keep the direction of the taper face 32a by forming the pin 32 integrally with the holding rail 13, the quality of a product always become stable. By forming the returning pin 32 integrally with the holding rail 13, it becomes unnecessary to separately manufacture the returning pin 32 and to fix the pin 32 to the base chassis 11. Therefore, cost of the process of the separate manufacture and the fixture of the pin 32 can be reduced. In FIG. 13, symbol 33 denotes a locking pin which is fixed to the base chassis 11 through caulking. The entire length of the locking pin is made shorter than that of the returning pin 32 so as not to contact with the activation end 30a of the returning lever 30.

In FIG. 13, symbol 35 denotes a pop-out mechanism of the disk tray 1, in which a tensile coil spring 37 is stretched to a slide member 36. Thereby, when the disk tray 1 advances leftward on FIG. 13, the rear end of the disk tray 1 contacts with an end 36a of the slide member 36. When the disk tray 1 further advances and is locked at its regular position, the tensile coil spring 37 extends and the spring force of the spring 37 is stored. Therefore, when the disk tray 1 is ejected and unlocked, the spring force stored in the tensile coil spring 37 is instantaneously released and the disk tray 1 is ejected and popped out.

Then, the operation mode of the ejecting/locking mechanism B having the above configuration is explained as follows. When the disk tray 1 to be loaded advances at first, the returning pin 32 contacts with the activation end 30a of the returning lever 30, and the returning lever 30 then rotates counterclockwise, the action end 30b contacts with the front end of the canceling lever 28 to move the lever 28 rightward in parallel. Accordingly, the tensile coil spring 31 is extended and the movable piece 27f of the self-holding solenoid 27 is inserted into the energizing coils 27c and 27d and attracted by the magnetic force of the permanent magnet 27e and held.

Moreover, when the disk tray 1 further advances, the locking pin 33 enters the locking lever 29 while pressing its top slope, and the locking pin 33 engages with the angle portion 29e of the locking lever 29 to complete locking of the disk tray 1.

On the other hand, when canceling the locking state of the disk tray 1, that is, ejecting the disk tray 1 in order to unload the tray 1, a direct current is applied to the energizing coils 27c and 27d of the self-holding solenoid 27, the magnetic field formed by the permanent magnet 27e is canceled by the magnetic field generated by the solenoid 27, and restraint of the movable piece 27f is then canceled. Consequently, the spring force stored in the tensile coil spring 31 is released, the canceling lever 28 moves leftward in parallel, and the lower end of the canceling lever 28 contacts with the activation end 29c of the locking lever 29 to rotate the locking lever 29 clockwise. As a result, at this moment, engagement between the locking pin 33 and the angle portion of the locking lever 29 is canceled and the disk tray 1 is popped out in accordance with the action of the tensile coil spring 37 of the above-described pop-out mechanism 35.

Then, a configuration for improving the static stability of the disk tray 1 while loading and locking the disk tray 1 in the chassis case 10 will be described below. As described above, the disk tray 1 moves forward and backward in the chassis case 10. To allow the forward and backward movements of the disk tray 1, a slight clearance is necessary for its support mechanism. However, because the clearance also allows vibrations of the disk tray 1, it causes a read error or write error when an impact is added.

Moreover, as a disk drive is further decreased in thickness, the distance between a clamping mechanism 2a and the inner wall surface of a cover chassis 12 decreases and the danger that they contact each other increases. Under such condition, if the clamping mechanism 2a contacts with the inner wall surface of the cover chassis 12 due to some external cause, the rotational speed of the optical disk quickly lowers to cause a trouble such as a read error or write error. Thus, the above-mentioned troubles are the important issues to be solved in the tendency of decreasing the thickness of the disk drive while increasing the recording density of it.

Figure 14:
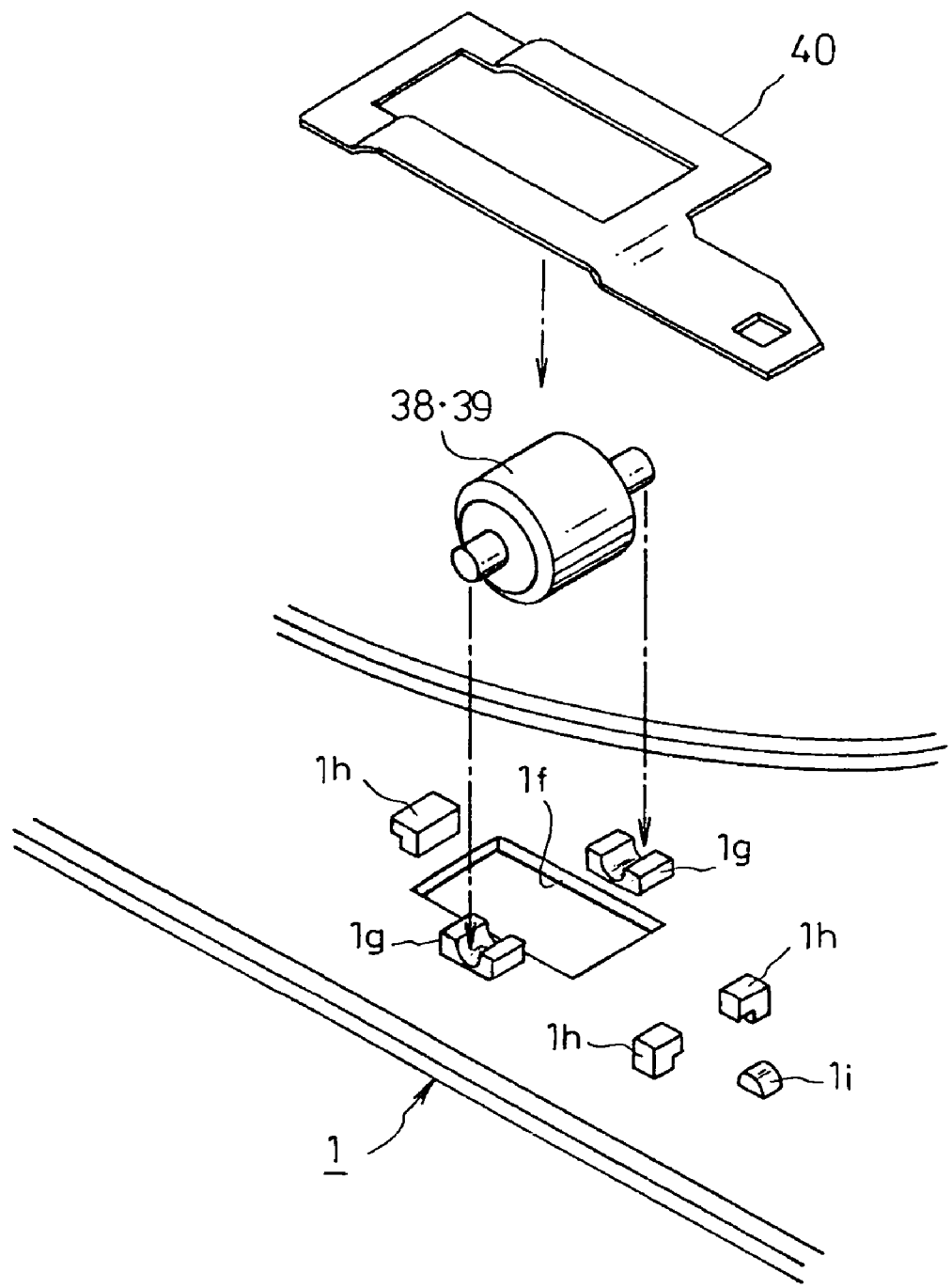
FIG. 14 is an exploded perspective view of a roller structure for generating a static pressure.
Figure 15:
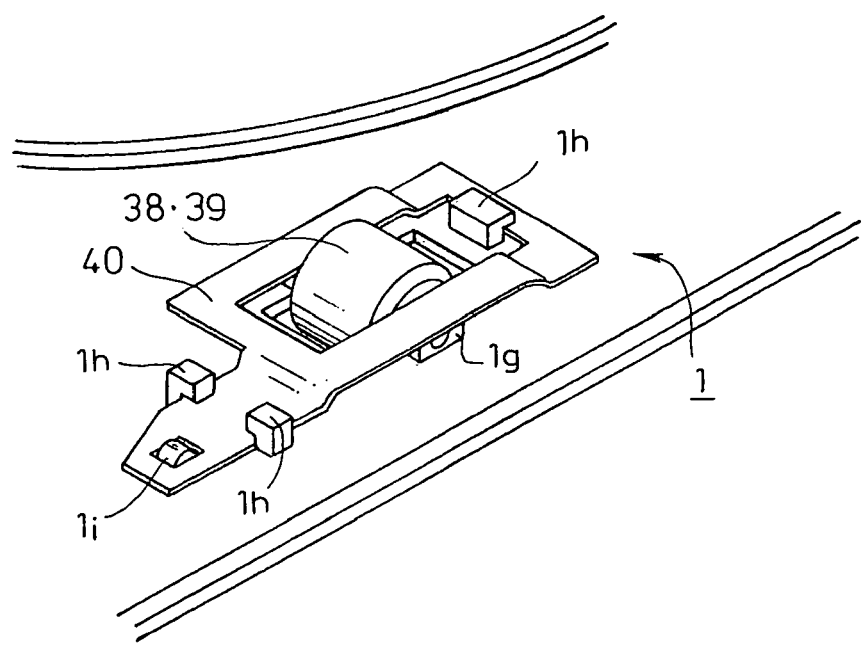
FIG. 15 is an assembling perspective view of a roller structure for generating a static pressure.

Therefore, the present invention is constituted in order to always generate a pressing force for pressing the disk tray 1 in the direction perpendicular to a recording medium when the disk tray 1 is locked. The above configuration is described now. In FIGS. 1 or 3, rollers 38 and 39 are set inside of an essential portion of the disk tray 1, so that a part of rolling surfaces of the rollers 38 and 39 are exposed to the surface of the disk tray 1. In such configuration, as shown in FIG. 14, a bearing block 1g is formed at the both sides of a window hole if and an angle 1h and a positioning boss 1i for hooking and fixing a support plate 40 before and after the bearing block 1g in both front and back are formed. By setting shafts of the rollers SB and 39 to the bearing block 1g as well as holding and fixing the support plate 40 to the angle 1h, the rollers 38 and 39 are rotatably attached to the back surface of the disk tray 1 as shown in FIG. 15.

Figure 16:
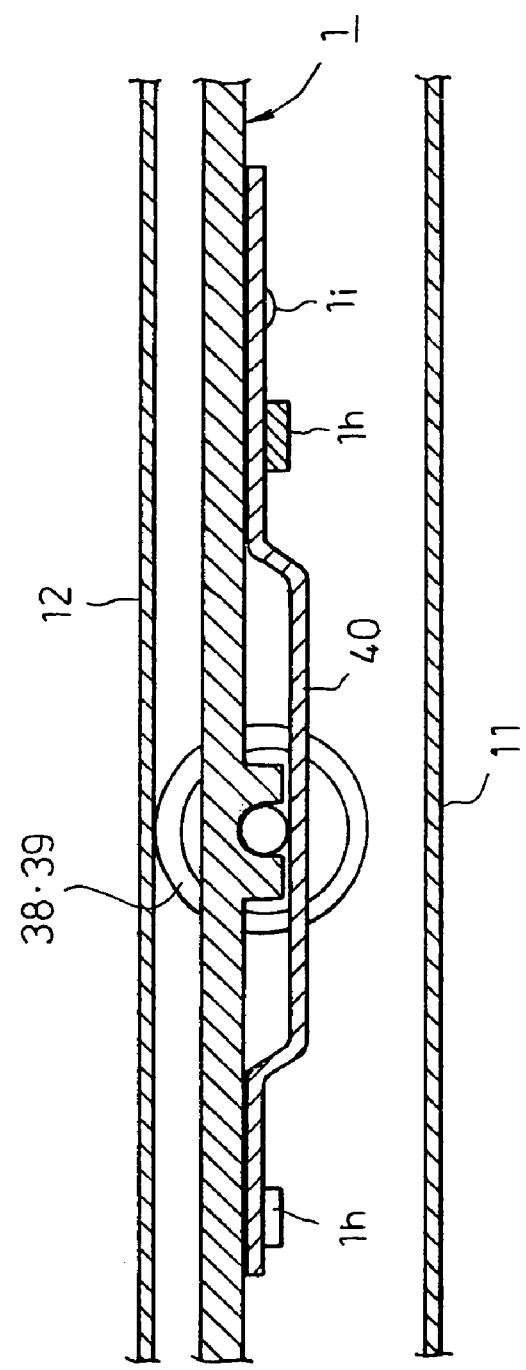
FIG. 16 is a sectional view showing a state in which a roller structure functions.
Figure 17:
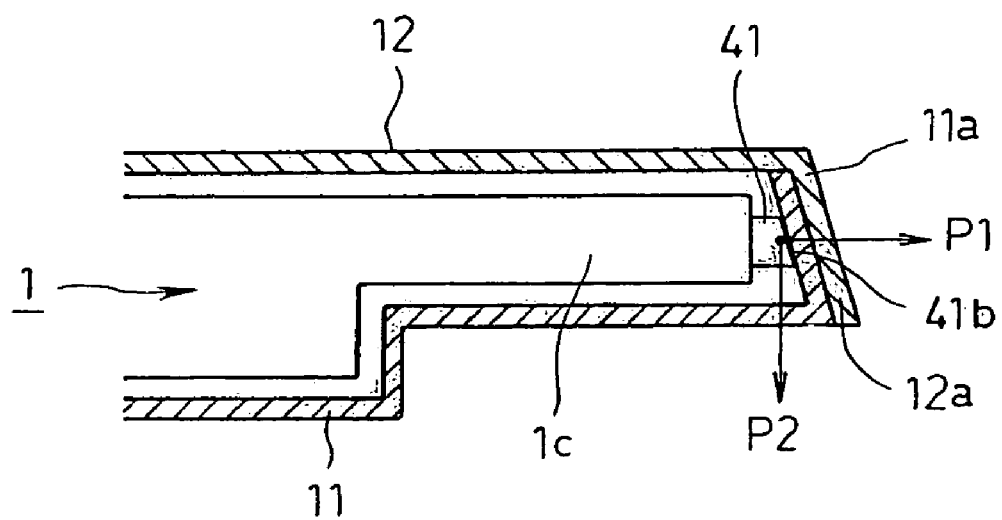
FIG. 17 is a sectional view for explaining a structure and a function of a side arm.
Figure 18:
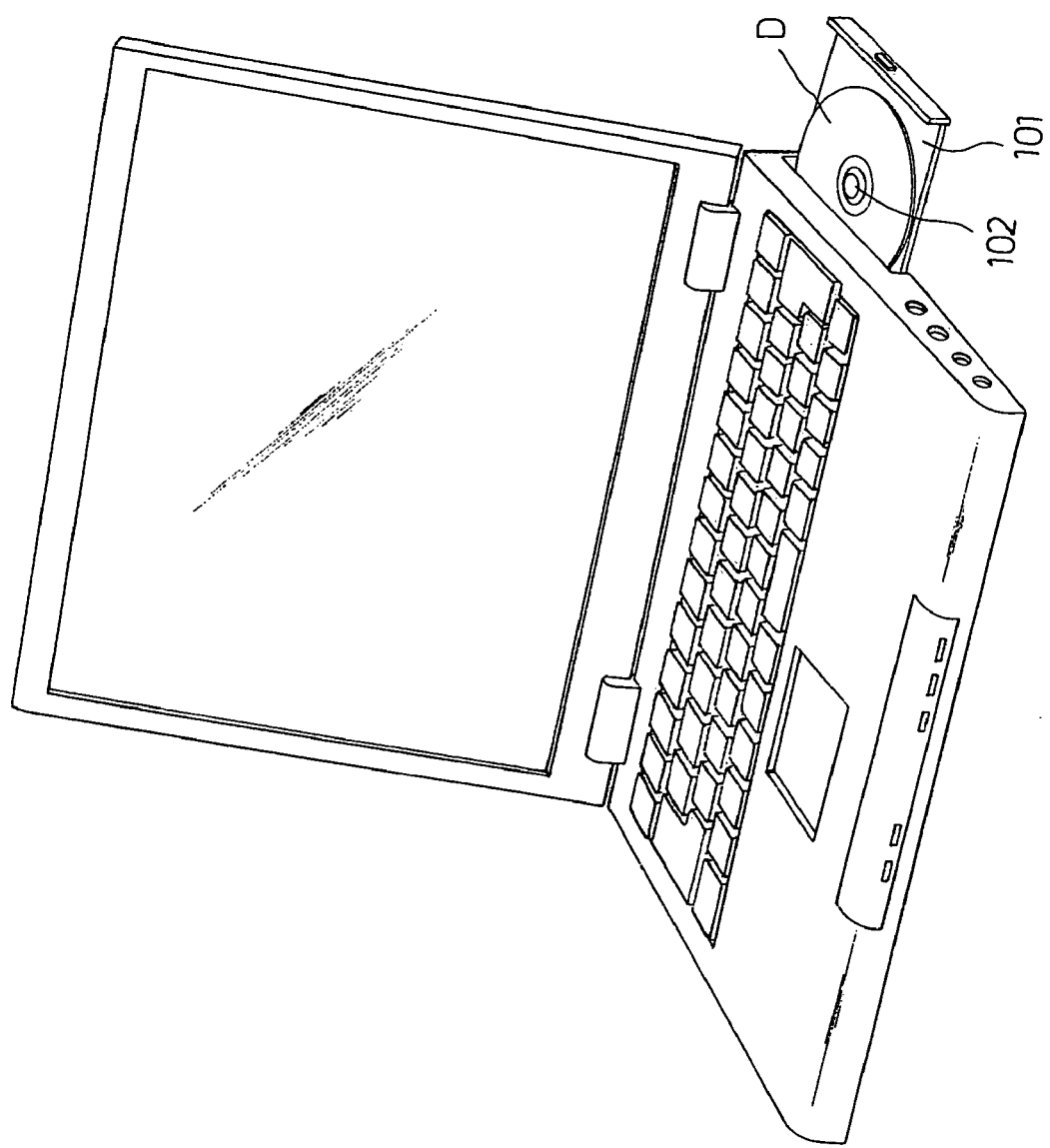
FIG. 18 is a perspective view showing the appearance of a general notebook PC.
Figure 19:
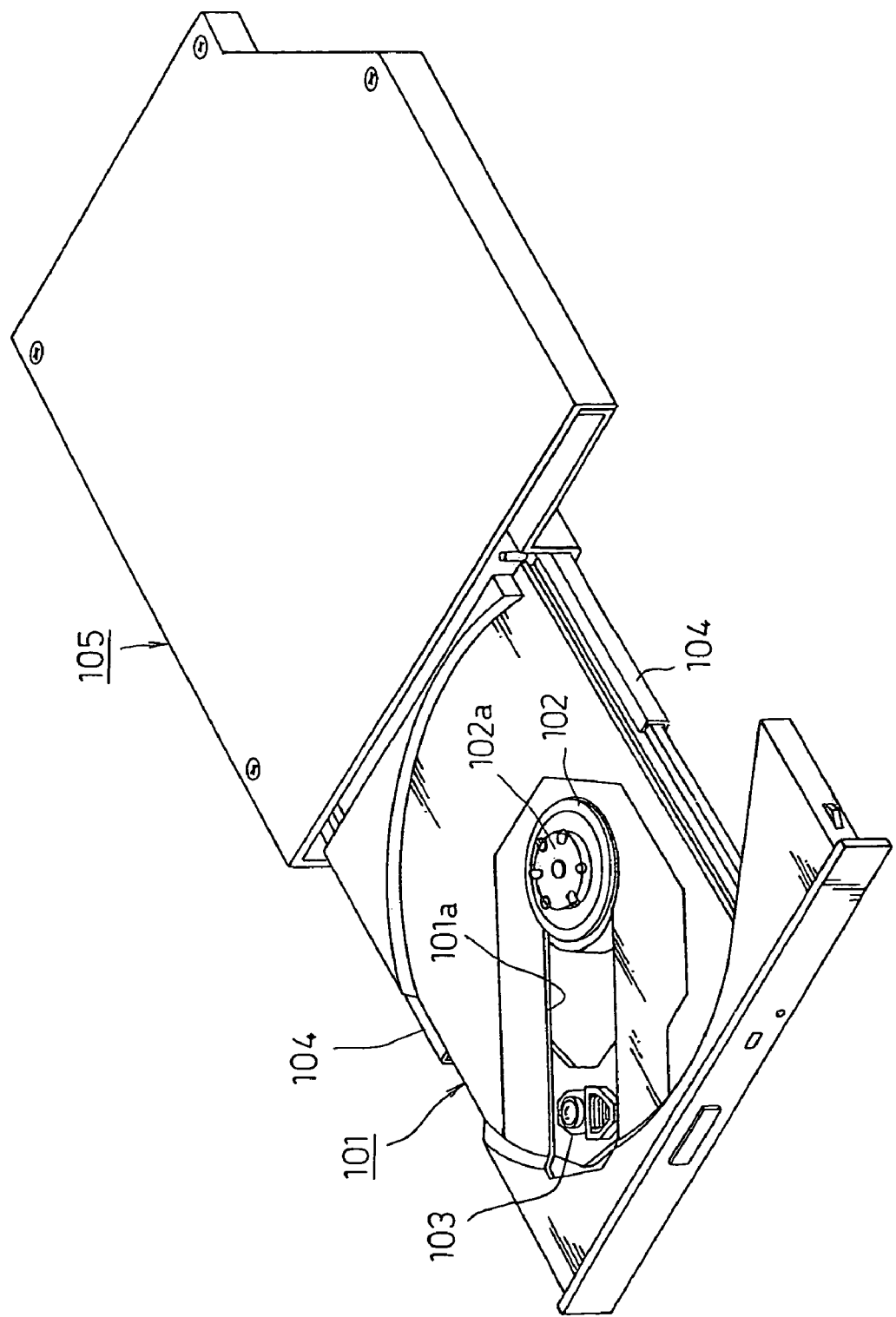
FIG. 19 is a perspective view showing the appearance of a conventional disk drive.
Figure 20:
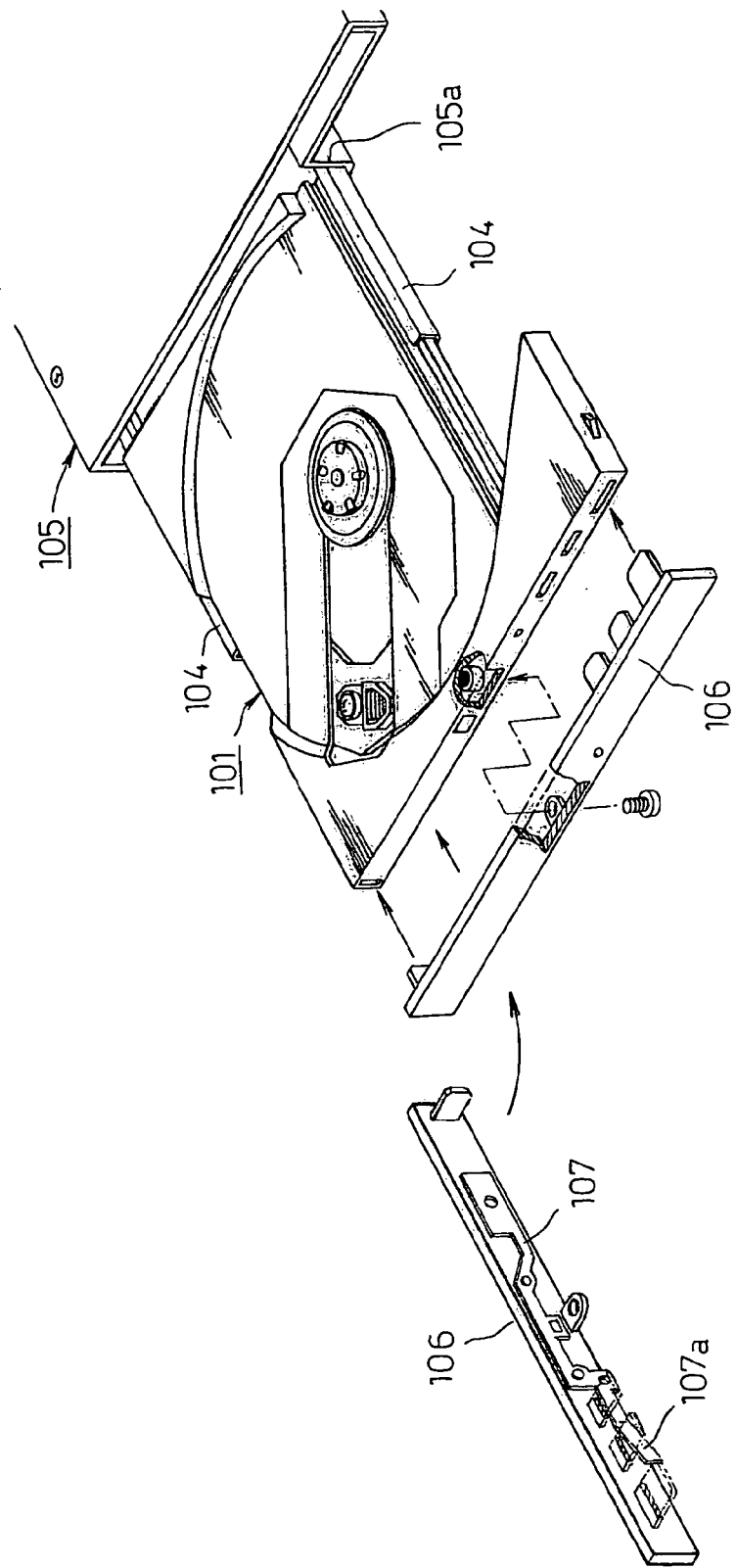
FIG. 20 is a perspective view of an essential portion of a conventional disk drive.

FIG. 16 shows an enlarged view of the rollers 38 and 39 thus set in the chassis case 10, and the rolling surfaces of the rollers 38 and 39 which is exposed to the surface of the disk tray 1 contact with the inner wall surface of the cover chassis 12. In this case, the support plate 40 for supporting roller shafts functions as a leaf spring to press the rollers 38 and 39 against the cover chassis 12. Therefore, the cover chassis 12 functions as a reaction point at positions where the rollers 38 and 39 stop, and static pressure is generated in the disk tray 1. Moreover, because the static pressure is generated in the disk tray 1, the pressing force for pressing the disk tray 1 in the "direction perpendicular to a recording medium" is generated.

The configuration adopting the above-mentioned rollers 38 and 39 makes it possible to apply to a portion structurally having a comparatively wide margin at one side of the disk tray 1. Conversely, it is impossible to apply the above configuration using rollers to a corresponding side of a disk drive having a standard appearance. However, to further secure the static stability of the disk tray 1, it is preferable that a static pressure is generated at the both sides of the disk tray 1; therefore, the present invention solves the problem by improving a slider mechanism built in the side arm.

In FIG. 12, a slider mechanism C built in the side arm 1c is constituted by a slider 41 whose one end is pivoted, which is energized clockwise on FIG. 12 by a torsion coil spring 42, and whose front end 41a slides. Moreover, a downward gradient slope 41b extending from the upper part to the lower part is formed at the side of the front end 41a of the slider 41. On the other hand, a sidewall 11a of the base chassis 11 and a sidewall 12a of the cover chassis 12 are formed in the same angle with the tilt angle of the slope 41b of the front end 41a.

Because of the above configuration, when housing the disk tray 1 in the chassis case 10, the front end 41a of the slider 41 and the sidewall 11a of the base chassis 11 slide and contact each other by their slopes. Under the above state, because the slider 41 is energized (P1) outward by the torsion coil spring 42, the original function that it is possible to keep a horizontal stable state of the disk tray 1 is realized and a downward component force (P2) is generated by slide and contact between the slopes. Thus, the component force serves as a static pressure and thereby, a horizontal stable state of the disk tray 1 is kept and a pressure is generated which presses the disk tray 1 in the "direction perpendicular to a recording medium".

ADVANTAGES OF THE INVENTION

As described above in detail, according to a configuration of a disk tray of the present invention, a pressing force for pressing a disk tray in the "direction perpendicular to a recoding medium" is generated when the disk tray is housed in a chassis case. Therefore, a structural clearance is sealed and it is possible to improve the static stability of the disk tray. Thereby, it is possible to improve the structural strength of the disk tray portion. Therefore, it is possible to improve a vibration resistance, accurately keep the clearance between a turntable and the back of a cover chassis, and realize a disk tray excluding factors of a read error and a write error and having a high reliability.

Moreover, because a roller mechanism is set to an effective portion of a disk tray and a side arm is constituted by improving a slider, it is possible to generate a static pressure on the whole surface of the disk tray and realize a high structural reliability.

What is claimed is:

1. A disk drive, comprising:
   a chassis case,
   a disk tray which supports a disk-shaped recording medium and is movable between a loading position in said chassis case and an unloading position outside of said chassis case, and
   a pressing means set between said chassis case and said disk tray to generate a pressing force for pressing said disk tray in the direction perpendicular to the recording medium by using said chassis case as a reaction point when loading the disk tray;
   said pressing means comprising a roller supported by either of said chassis case and said disk tray, and provided with a roller surface contacting the other of said chassis case and said disk tray;
   wherein said pressing means presses said disk tray in the direction perpendicular to the recording medium when said disk tray is in the loading position.

2. The disk drive according to claim 1, wherein
   the pressing force is generated by a roller elastically supported so that a rolling surface is exposed from the surface of said disk tray and by a slider of a side arm.

3. The disk drive according to claim 1, wherein
   said pressing means does not generate the pressing force against said disk tray when said disk tray is located at the unloading position, and said pressing means generates the pressing force against said disk tray when said disk tray is located at the loading position.

4. The disk drive according to claim 1, further comprising:
   a disk support means disposed in the disk tray, the disk support means rotatably supporting the recording medium,
   wherein said pressing means generates the pressing force against said disk tray while said disk tray moves from the unloading position to the loading position and before the disk support means enters said chassis case, and
   said pressing means presses said disk tray in the direction perpendicular to the recording medium when said disk tray is in the loading position.

5. The disk drive according to claim 1,
   wherein said pressing means further comprises a contact face tilting in both directions of the direction perpendicular to the recording medium and a radial direction of the recording medium and a contact portion contacting with the contact face, and generates the pressing force in the direction substantially perpendicular to the contact face against said disk tray, and
   said pressing force presses said disk tray by a component force parallel to the surface of the recording medium and a component force perpendicular to the surface of the recording medium.

6. The disk drive according to claim 5,
   said disk tray comprising a main body portion having a dimensional shape from which a part of the recording medium protrudes and the side arm portion extending along the recording medium protruded from the main body portion, said chassis case comprising a convex housing portion for housing the recording medium protruding from the main body portion of said disk tray and the side arm portion of said disk tray, and said pressing means is set between the side arm portion of the disk tray and the housing convex portion of the chassis case.

7. A disk drive, comprising:

a chassis case, a disk tray which supports a disk-shaped recording medium and is movable between a loading position in said chassis case and an unloading position outside of said chassis case, a pressing means set between said chassis case and said disk tray to generate a pressing force for pressing said disk tray in the direction perpendicular to the recording medium by using said chassis case as a reaction point; and a disk support means disposed in the disk tray, the disk support means rotatably supporting the recording medium;

wherein said pressing means comprises a roller supported by either of said chassis case and said disk tray, and provided with a roller surface contacting the other of said chassis case and said disk tray, and said pressing means generates the pressing force against said disk tray while said disk tray moves from the unloading position to the loading position and before the disk support means enters said chassis case.

* * * * *

UNITED STATES PATENT AND TRADEMARK OFFICE
CERTIFICATE OF CORRECTION

| | |
|---|---|
| PATENT NO. | : 7,089,569 B2 |
| APPLICATION NO. | : 10/697952 |
| DATED | : August 8, 2006 |
| INVENTOR(S) | : Nobuki Matsui et al. |

It is certified that error appears in the above-identified patent and that said Letters Patent is hereby corrected as shown below:

Column 11, line 8, "SB" should read --38--.

Signed and Sealed this

Twenty-seventh Day of March, 2007

JON W. DUDAS
*Director of the United States Patent and Trademark Office*